United States Patent [19]

Fely et al.

[11] Patent Number: 5,238,568
[45] Date of Patent: Aug. 24, 1993

[54] POROUS CARBON-CARBON COMPOSITE FILTERING MEMBRANE SUPPORT WITH A CARBON FIBRE MAT SUBSTRATE

[75] Inventors: Daniel Fely, Gennevilliers; Hélène Septier, Colmar; Michel Moreau, Clichy; Jacques Maire, Paris, all of France

[73] Assignee: Le Carbone Lorraine, Courbevoie, France

[21] Appl. No.: 730,646

[22] Filed: Jul. 16, 1991

[30] Foreign Application Priority Data

Jul. 17, 1990 [FR] France .................................. 90 09352

[51] Int. Cl.$^5$ ........................ B01D 29/05; B01D 39/06
[52] U.S. Cl. ..................................... 210/490; 210/483; 210/505; 210/509; 210/510.1; 210/500.26
[58] Field of Search ............ 210/483, 490, 491, 500.1, 210/500.26, 503, 506, 509, 505, 510.1; 264/29.1; 428/288; 427/248.1; 55/16

[56] References Cited

U.S. PATENT DOCUMENTS

| 4,434,206 | 2/1984 | Fukuda et al. ...................... 264/29.1 |
| 4,582,750 | 4/1986 | Lou et al. ............................. 428/288 |
| 4,687,697 | 8/1987 | Cambo et al. ........................ 210/505 |
| 4,889,630 | 12/1989 | Reinhardt et al. ................... 210/509 |
| 4,944,996 | 7/1990 | Bauer et al. .......................... 210/509 |
| 4,950,454 | 8/1990 | Masuda et al. ....................... 210/506 |

FOREIGN PATENT DOCUMENTS 2582956 12/1986 France .

*Primary Examiner*—Mary Lynn Theisen
*Assistant Examiner*—Ana M. Fortuna
*Attorney, Agent, or Firm*—Dennison, Meserole, Pollack & Scheiner

[57] ABSTRACT

A membrane support usable for separative procedures is disclosed. The support is a mechanically solid composite carbon-carbon material of limited thickness in the passage direction Z of a flow to be treated, which composite has a porous texture appropriate for the membrane, with a fibrous substrate and a porous carbon-containing matrix. To increase the permeability and reduce the roughness of the outer surface of the support to be brought into contact with the membrane, the fibrous substrate is a carbon fibre mat of carbon fibre segments contained in a plane perpendicular to the Z axis and randomly oriented in that plane. Optionally a fraction of the support to be in contact with the membrane contains an inert fine powder dispersion making it possible to adjust the diameter of the pores of the outer face of the support. Also disclosed is a process for the production of this membrane support and its use as a membrane support and as a filtering element without the addition of a membrane.

10 Claims, 4 Drawing Sheets

POROUS CARBON-CARBON COMPOSITE FILTERING MEMBRANE SUPPORT WITH A CARBON FIBRE MAT SUBSTRATE

FIELD OF THE INVENTION

The invention relates to the field of filtering elements and more particularly relates to a support for receiving a membrane for separative procedures.

PRIOR ART

In separative procedures, sucha s reverse osmosis, ultrafiltration and microfiltration use is made either of organic membranes, or over the last few years mineral membranes. As a function of the type of use, these membranes must have small pore sizes appropriate for the envisaged use, as well as a minimum thickness so as to permit a low pressure drop on filtration (high permeability). Finally, in the case of mineral membranes, the support must have high mechanical characteristics.

There is already considerable interest in composite carbon-carbon (C—C) materials for producing filter membrane supports making it possible to satisfy the aforementioned requirements. In addition, these composite C—C supports have a high chemical inertia, which leads to an absence of filtrate contamination and an absence of support corrosion, at least under the standard conditions of use.

Thus, U.S. Pat. No. 4,944,996 to Bauer et al, assigned to the assignee of the present invention describes a mineral membrane support constituted by a thin composite C—C material, in which the fibrous substrate is constituted by a carbon textile (fibres and/or cloth and/or felt) optionally associated with a mat of random arranged fibres. Although having a limited thickness, such a composite material support has adequate mechanical characteristics and in particular a resistance to bursting, crushing and bending in the case of tubes.

POSITION OF THE PROBLEM

The membrane supports described in U.S. Pat. No. 4,944,996 already have high performance characteristics, but the Applicant has found that they were not suitable as thin membrane supports due to their surface irregularity. Thus, the thinner the membrane, the more the surface of the support in contact with the membrane must be regular, without roughness and in particular without significant surface defects, if not it is difficult and even impossible to deposit a membrane of regular thickness. In addition, the surface irregularities of the support can at least partly be transmitted to the surface of the actual membrane. Furthermore, if the membrane surface has the minimum possible unevenesses and has a minimum roughness, it can be more easily cleaned and unclogged.

The Applicant has continued its research for solving this problem and more particularly for developing membrane supports making it possible to obtain the maximum permeability and therefore the highest possible filtering speed.

DESCRIPTION OF THE SOLUTION

According to the invention, the support for receiving a membrane usable for separative procedures is constituted by a mechanically solid carbon-carbon composite material of limited thickness in the passage direction Z of the flow to be treated, having a porous structure suitable for the diaphragm, comprising a fibrous substrate and a porous carbon-containing matrix, characterized in that so as to increase the permeability and reduce the roughness of the outer face of the support to be brought into contact with the said diaphragm, the fibrous substrate is a mat of carbon fibres, constituted by fibre segments contained in a plane perpendicular to the Z axis and oriented in random manner in the said plane and in that optionally, a fraction of the support to be brought into contact with said membrane contains a fine inert powder dispersion making it possible to adjust the diameter of the pores of the outer face of the support.

A mat is an unwoven layer constituted by a random dispersion of relatively short fibres in the plane. It consists of a random bidimensional orientation of fibre segments constituting an entangled structure linking the segments together and making it possible to handle the thus formed layer. FIG. 4b is a diagrammatic representation of said random orientation in a plane perpendicular to the Z axis. particularly advantageous to use as the substrate a fibrous reinforcement constituted solely by a carbon fibre mat or a stack of mats. Thus, a substrate formed only by a carbon fibre mat (volume fraction between 15 and 55% and preferably 25 and 45% of the total volume) makes it possible to obtain a support having mechanical characteristics substantially comparable to those obtained with a substrate having a cloth or felt of carbon fibres; on the other hand improve the regularity of the surface of the support compared with a support whose surface substrate is a cloth or a felt; and finally and in particular significantly increase the permeability of the support. Up to 25 times the permeability obtained according to the prior art is achieved, which is considerable and of great practical interest.

According to the invention, the substrate constituted by the mat making it possible to achieve these performance characteristics is obtained in the following way. The starting product is constituted by mats of carbon fibres or, in preferred manner, carbon precursor optionally in the crosslinked state. These initial mats are constituted by bidimensional entangled structures of carbon precursor or carbon fibre segments of average length between 1 and 100 mm and preferably between 20 and 80 mm. Their surface density is generally between 50 and 300 g/m$^2$. The mat can optionally be needled.

The mat is positioned on a support having the requisite shape and which is preferably rigid, which does not adhere to the mat and optionally stacking takes place of several mat layers, the number of layers necessary being in particular a function of the thickness of the final support. The stack of mat layers is then cold compressed under a pressure between 5 and 10 mPa and is heated to between 100° and 300° C. for between 1 and 50 hours in order to consolidate the fibrous structure. The apparent density of the compressed fibrous substrate obtained in this way is between 0.2 and 0.6 and is preferably close to 0.5.

On starting with a carbon precursor fibre mat, it is then optionally possible to carry out a carbonization at between 800° and 1200° C., which will transform the precursor into carbon fibres.

The previously obtained and optionally carbonized fibrous substrate is then densified in known manner, either by impregnation and carbonization of a resin preferably chosen so as to leave a high coke level by carbonization, or by chemical vapour phase carbon deposition, or finally by a combination thereof. The final density of the porous support is between 0.7 and 1.2 and preferably between 0.8 and 1, so as to simultaneously obtain adequate mechanical characteristics and permeability.

According to the invention, it is possible to incorporate fine powders into the mats during their stacking. These powders can be constituted by ground fibres of a material which is inert, particularly with respect to carbon (carbon fibre, glass fibre, silicon carbide and similar powders) able to modify the diameter of the pores. In particular, it is advantageous to modify in this way the outer mat layer to come into contact with the membrane, so as to have, particularly in the case of a very thin membrane, a support with a very regular surface and an adapted porosity, but without significantly reducing the permeability of the support, because only a limited thickness of the support has been modified. In addition, a support whereof an outer face has been modified in this way can optionally be used as it is as the filtering element and without the addition of a membrane. These powders have an average particle size between 0.1 and 10 $\mu$m and in the outer part of the support where they are present, they occupy a volume fraction between 1 and 20% and preferably approximately 5% of the total volume.

Although the invention is particularly appropriate for the production of porous filter membrane supports in the form of planar plates by compression using a press having heated platens, it is possible according to the invention to obtain a support having any random shape, e.g. a tube, by isostatic compression on a "shaping" support having the sought shape, said "shaping" support and its mat layer being placed in a flexible, tight enclosure, e.g. a thermally stable, preferably thermoretractable plastic bag, the compression being followed by a heat treatment at 100° to 300° C. and then the removal of the flexible enclosure and possibly the "shaping" support prior to the densification using the means referred to hereinbefore.

The results obtained according to the invention are particularly surprising with respect to the permeability, which is 25 times greater for the support obtained in example 2 according to the invention than for the prior art support of example 3. The reasons have not been clearly established and could not have been anticipated even by comparing the micrographs of the supports obtained on the basis of the mat of FIG. 2 and the cloth of FIG. 3.

EXAMPLES

Figure 1:
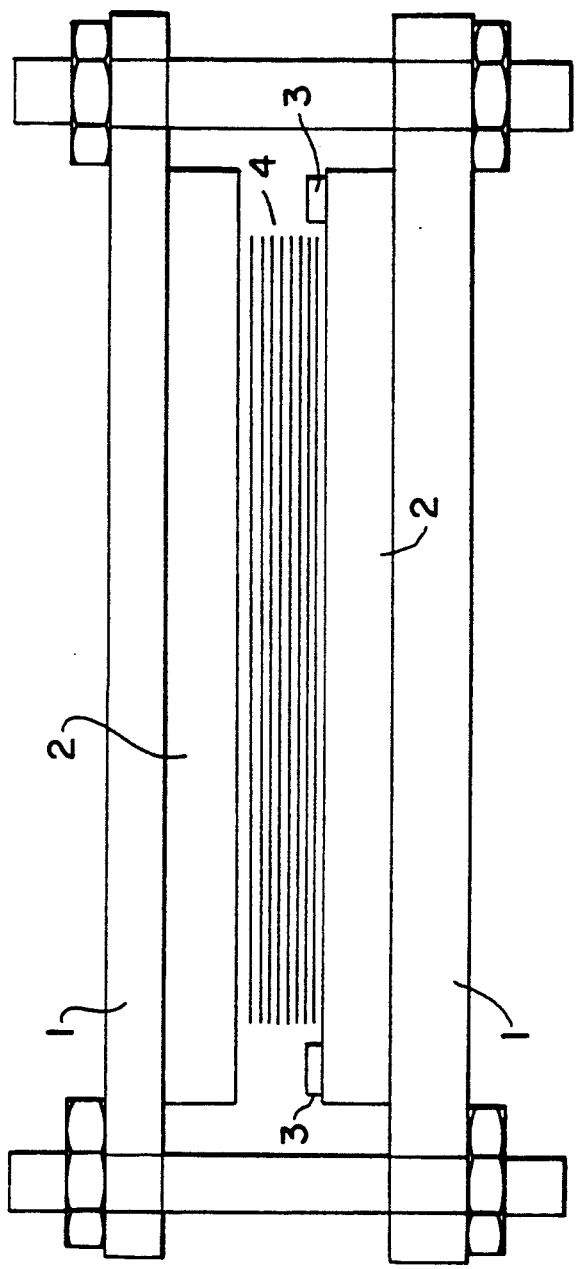
FIG. 1 diagrammatically shows in cross-section the platens of a press (1), a stack of mat layers (4) placed between two intercalated graphite layers (2) provided with shims (3).

Examples 1 and 2 correspond to the invention, whilst example 3 relates to a comparative test according to the prior art.

EXAMPLE 1

The starting product is a carbon precursor fibre mat (polyacrylonitrile fibre in the crosslinked state) with a surface density of 130 g/m$^2$. The average fibre length is 63 mm. The apparent density is 0.01. Stacking takes place of 10 mat layers, i.e. giving a thickness of 13 mm and compression takes place between two metal platens (1) of a press equipped with intercalated graphite layers (2) to give a thickness of 1.5 mm (the thickness being determined by the shims (3)). The apparent density is then 0.5. The compressed mat stack is heated to 250° C. and is kept at this temperature for 24 h in order to consolidate the structure.

The thus obtained substrate is then carbonized by heating it, together with the two intercalated protective graphite layers to 900° C., the temperature rise being 12.5° C./h and this temperature is maintained for 6 hours.

After cooling to ambient temperature, the substrate is separated from the intercalated graphite layers. This gives a handlable, but fragile substrate. The latter is densified by the impregnation of a phenolic resin, which is crosslinked and carbonized in known manner. After crosslinking the resin at 200° C., the apparent density of the thus obtained support is 1.25 and its permeability is between 30 and 60 cm$^3$/cm$^2$.s.bar. After carbonization at 900° C., a support with an apparent density of 0.86 and a permeability of 165 cm$^3$/cm$^2$.s.bar is obtained and which has a pore diameter (first pore diameter) between 32 and 34 $\mu$m. The surface state was characterized by its roughness: $R_T$=30-40 $\mu$m and $R_A$=4-5 $\mu$m.

EXAMPLE 2

Example 2 is identical to example 1 except that, after the treatment lasting 24 h at 250° C. for consolidating the substrate structure, the substrate is directly densified with a phenolic resin. Thus, in this example, there is no stage of carbonizing at 900° C. the crosslinked polyacrylonitrile fibre mat, said carbonization being carried out during the carbonization of the phenolic resin.

After impregnation with the phenolic resin and crosslinking, the apparent density is 0.96 and the permeability is between 130 and 180 cm$^3$/cm$^2$.s.bar. After carbonization at 900° C., a support is obtained of apparent density 0.90, a permeability of 250 cm$^3$/cm$^2$.s.bar and a pore diameter (first pore diameter) between 34 and 43 $\mu$m. The surface state was characterized by its roughness: $R_T$=30-40 $\mu$m and $R_A$=4-5 $\mu$m.

Figure 2:
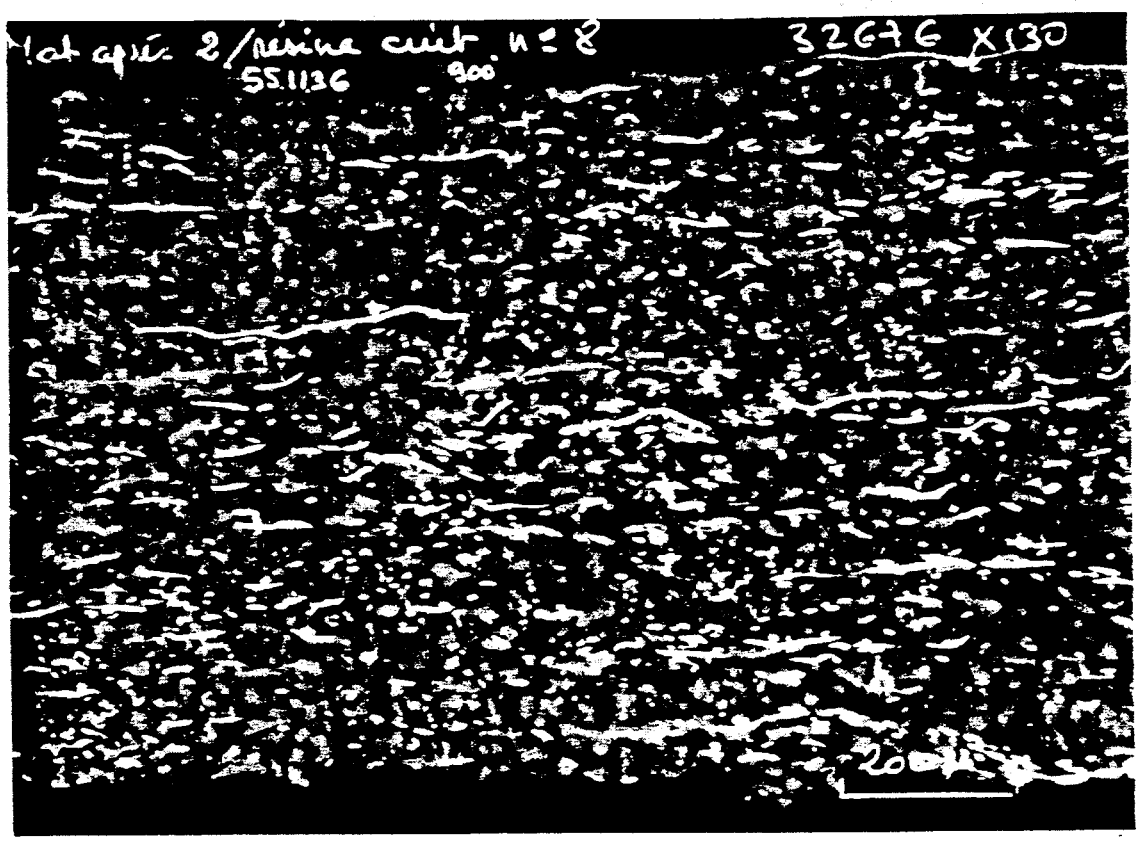
FIG. 2 is a micrograph ($\times$130) of the support obtained in example 2 and in cross-section perpendicular to the support.

FIG. 2 is a micrograph of a section perpendicular to the support obtained in this example.

EXAMPLE 3

A control test was carried out according to the prior art described in U.S. Pat. No. 4,944,996, starting with a carbon fibre cloth and not a mat, as in the present invention.

Using the phenolic resin of the two preceding examples a 300 g/m$^2$ carbon fibre cloth was impregnated. After carbonizing at 900° C., a support was obtained of density 1, a permeability of 10 cm$^3$/cm$^2$.s.bar and a pore diameter (first pore diameter) between 12 and 26 $\mu$m.

The surface state was characterized by its roughness: $R_T = 50-60$ μm and $R_A = 6-8$ μm.

Figure 3:
FIG. 3 is a micrograph ($\times$130) of the support obtained in example 3 and in cross-section perpendicular to the support.
Figure 4A:
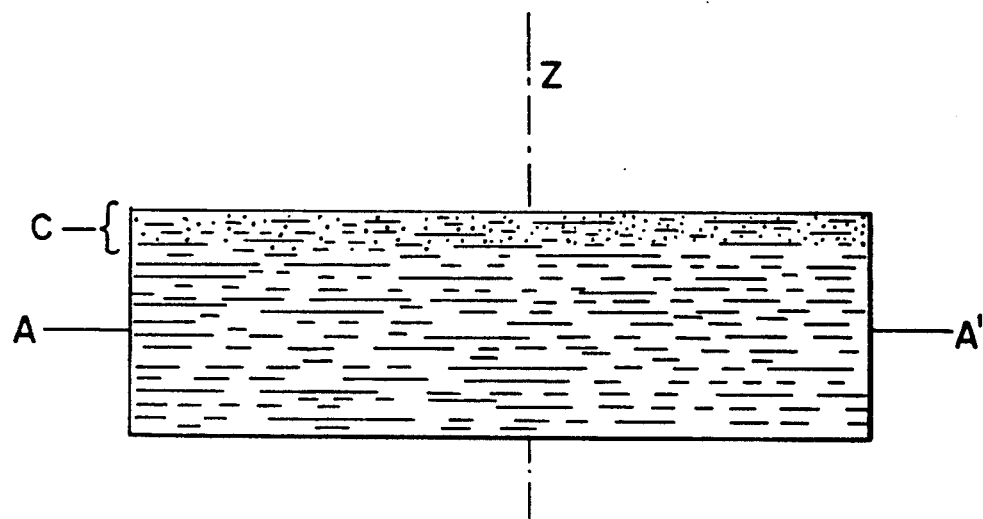
FIG. 4a diagrammatically illustrates a support with as the substrate a mat constituted by fibre segments substantially perpendicular to the Z axis and having an outer portion c containing fine powders (sectional view along the Z axis perpendicular to the support).
Figure 4B:
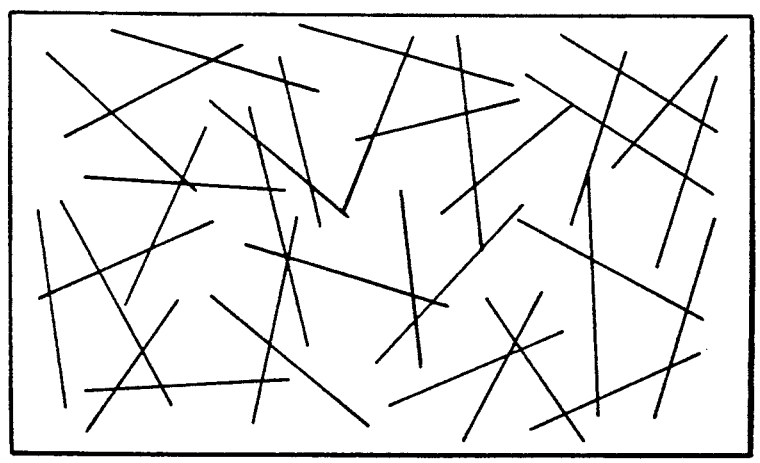
FIG. 4b diagrammatically illustrates a section of the support of FIG. 4a along the axis AA', perpendicular to the Z axis and showing the random orientation of the carbon fibre segments.

FIG. 3 is a micrograph of a section perpendicular to the support obtained in this example.

We claim:

1. A membrane support or filter element usable for separative procedures, constituted by a mechanically solid composite carbon-carbon material of limited thickness, in a direction of a flow to be treated, having a porous texture appropriate for the membrane support or filter element and comprising a fibrous substrate and a porous carbon-containing matrix, wherein the fibrous substrate is a carbon fibre mat, constituted by carbon fibre segments contained in a plane perpendicular to the direction of a flow to be treated and randomly oriented in said plane, and wherein the membrane support or filter element contains an inert fine powder dispersion for varying the diameter of the pores of an outer face of the membrane support or filter element.

2. Membrane support or filter element according to claim 1, wherein the volume fraction of the fibrous support is between 15 and 55% of the total volume.

3. Membrane support or filter element according to either of the claims 1 or 2, wherein the average length of said carbon fibre segments is between 1 and 100 mm.

4. Membrane support or filter element according to claims 1 or 2, wherein said fine powder is selected from the group consisting of carbon fibre, glass fibre or silicon carbide powders.

5. Membrane support or filter element according to claims 1 or 2, wherein the fibrous substrate is obtained from a needled mat.

6. A membrane support according to claim 1 comprising a mineral membrane support.

7. Membrane support or filter element according to either of the claims 1 or 2, wherein the average length of said carbon fibre segments is between 20 and 80 mm.

8. Membrane support or filter element according to claim 1, wherein the volume fraction of the fibrous support is between 25 and 45% of the total volume.

9. A membrane support or filter element usable for separative procedures, constituted by a mechanically solid composite carbon-carbon material of limited thickness in a direction of a flow to be treated, having a porous texture appropriate for the membrane support or filter element and comprising a fibrous substrate and a porous carbon-containing matrix, wherein the fibrous substrate is a carbon fibre mat, constituted by carbon fibre segments contained in a plane perpendicular to the direction of a flow to be treated and randomly oriented in said plane, wherein the membrane support or filter element contains an inert fine powder dispersion for varying the diameter of the pores of an outer face of the membrane support or filter element, and wherein said fine powder is carbon fibre, glass fibre or silicon carbide powders.

10. A membrane support or filter element usable for separative procedures, constituted by a mechanically solid composite carbon-carbon material of limited thickness in a direction of a flow to be treated, having a porous texture appropriate for the membrane support or filter element and comprising a fibrous substrate and a porous carbon-containing matrix, wherein the fibrous substrate is a carbon fibre mat, constituted by carbon fibre segments contained in a plane perpendicular to the direction of a flow to be treated and randomly oriented in said plane, wherein the membrane support or filter element contains an inert fine powder dispersion for varying the diameter of the pores of an outer face of the membrane support or filter element, wherein the volume fraction of the fibrous support is between 15 and 55% of the total volume, and wherein said fine powder is carbon fibre, glass fibre or silicon carbide powders.

* * * * *

UNITED STATES PATENT AND TRADEMARK OFFICE
CERTIFICATE OF CORRECTION

PATENT NO. : 5,238,568
DATED : August 24, 1993
INVENTOR(S) : Daniel Fely et al

It is certified that error appears in the above-identified patent and that said Letters Patent is hereby corrected as shown below:

Column 1, line 12, change "sucha s" to --such as--.

Column 2, line 52, change "mPa" to --MPa--.

Signed and Sealed this

Twelfth Day of April, 1994

Attest:

BRUCE LEHMAN

Attesting Officer    Commissioner of Patents and Trademarks